(12) United States Patent
Zhu et al.

(10) Patent No.: US 8,525,674 B2
(45) Date of Patent: Sep. 3, 2013

(54) COLLECTIVE OBJECTS MANAGEMENT SYSTEM WITH OBJECT IDENTIFICATION USING ADDRESSABLE DECODER UNITS

(75) Inventors: Shengbo Zhu, San Jose, CA (US); Su Shiong Huang, Bellevue, WA (US)

(73) Assignee: iMicrodata Corporation, San Jose, CA (US)

( * ) Notice: Subject to any disclaimer, the term of this patent is extended or adjusted under 35 U.S.C. 154(b) by 549 days.

(21) Appl. No.: 12/802,645

(22) Filed: Jun. 12, 2010

(65) Prior Publication Data

US 2011/0304456 A1    Dec. 15, 2011

(51) Int. Cl.
  *G08B 13/14*    (2006.01)
  *G08B 21/00*    (2006.01)

(52) U.S. Cl.
  USPC .......... 340/540; 340/570; 340/572.2

(58) Field of Classification Search
  USPC .......... 340/570, 572, 815.4, 9.1–9.17
  See application file for complete search history.

(56) References Cited

U.S. PATENT DOCUMENTS

| | | | | |
|---|---|---|---|---|
| 5,158,347 A | * | 10/1992 | Warren et al. | 312/319.8 |
| 5,424,858 A | * | 6/1995 | Gillotte | 398/108 |
| 5,450,070 A | * | 9/1995 | Massar et al. | 340/8.1 |
| 5,586,665 A | * | 12/1996 | Brousseau | 211/59.2 |
| 5,721,531 A | * | 2/1998 | Garver et al. | 340/8.1 |
| 5,739,765 A | * | 4/1998 | Stanfield et al. | 340/8.1 |
| 5,805,074 A | * | 9/1998 | Warren et al. | 340/5.54 |
| 5,936,527 A | * | 8/1999 | Isaacman et al. | 340/572.1 |
| 6,664,895 B2 | * | 12/2003 | Zhu | 340/570 |
| 7,079,044 B1 | * | 7/2006 | Stanfield et al. | 340/8.1 |
| 7,113,095 B2 | * | 9/2006 | Kuzma et al. | 340/572.7 |

\* cited by examiner

*Primary Examiner* — Daniel Wu
*Assistant Examiner* — Mohamed Barakat (57) ABSTRACT

A collective objects management system for objects such as documents contained in file folders in drawers of file cabinets. Each file folder has an electrical circuit with a visible indicator mounted on the file folder. Each folder circuit has an address decoder with a unique system address which enables generation of a VALID signal whenever an incoming address from a source is a match, and a circuit for deriving operating power for the address decoder from an incoming address signal. A local microcomputer and optional encoder receive incoming object identification signals from the source and supplies the desired object address to all the file folders in the cabinet. To aid the user, each file drawer has a visible indicator mounted on the front panel, the panel indicator being illuminated when the sought folder is contained in that drawer. The invention can be applied to a wide variety of collective objects management systems, such as supermarkets, automobile parts distributors, and various manufacturing operations.

20 Claims, 9 Drawing Sheets

COLLECTIVE OBJECTS MANAGEMENT SYSTEM WITH OBJECT IDENTIFICATION USING ADDRESSABLE DECODER UNITS

BACKGROUND OF THE INVENTION

This invention relates to collective objects management systems in general, and in particular to an improved collective objects management system using object identification with digital decoders having unique addresses. More particularly, this invention relates to an improvement for a collective objects management system using object identification with digital decoders having unique addresses, the improvement pertaining to minimizing the number of ohmic conductors required to provide an operating system.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed, some type of file management system is necessary.

In the case of file storage management, each file folder is typically provided with a tab portion visible when the file drawer is opened (usually along the upper edge of the folder) and containing readable information describing the content of the folder. The readable information is typically a short form of identification, such as an account name, a subject name (e.g., "Utilities Bills") or the like.

In order to provide ready access to the individual documents contained in the folders, some type of indexing arrangement is normally used to identify the drawer location of each folder. A simple technique commonly employed is an alphabetical index card placed on the front panel of each drawer listing the file folders in alphabetical order. For example, one file drawer panel might have an index card listing files starting with the letters A-F, another drawer might have an index card listing files starting with the letters G-L, etc. Frequently, more sophisticated indexing arrangements are used, such as a computer-based index listing all files by a short form identifier and a corresponding enlarged and more thorough description of the file contents. Even such computer-based arrangements still require the use of a readable tab or tag on each file folder in order to identify a given folder to a user. This is highly undesirable, since it facilitates the search by any unauthorized user for a specific file name or for a file containing information of a particular type. Nevertheless, known file management systems require the use of visible tabs or tags in order for the files to be reasonably locatable.

In those applications in which several individuals have access to the file drawer contents, some arrangement is usually made to monitor the disposition of the files. For example, in a business application, it is convenient and sometimes necessary to provide a sign out and return procedure so that the whereabouts of a given file will always be known. Usually, such monitoring attempts fail to accurately track the files because of the failure of individuals to faithfully follow the procedure. Consequently, at any given time, the integrity of the file management system can only be verified by actually looking through each file drawer and checking the file folders and their contents with the master index. This requirement is both time-consuming and burdensome, and thus a severe disadvantage.

In known file management systems of the type described above, once a file folder is provided with a contents identifier, that folder is permanently associated with the nature of its contents. To change the contents to some other category, the folder must either be thrown away and a new, unmarked folder substituted in its place, or the identification label must be changed. In addition, the master index must be up-dated, either manually or by using the computer in a computer-based indexing system. These procedures are not always followed by office personnel, and the integrity of the file system is consequently compromised.

In all examples of known collective objects management systems, either the containers for the different objects or the objects themselves are usually provided with some type of human readable or machine readable identification indicia, such as a label or tag affixed to the object or the container. In more sophisticated systems, a computer is used to assist in keeping track of the objects. When an object is removed from the usual location, some procedure is typically used to note the fact that that object has been removed from its normal location. This is accomplished either by operator entry of the change into the system computer, or by using tag or label reading devices (e.g., bar code readers) to enter the information into the system computer.

U.S. Pat. No. 5,977,875 issued Nov. 2, 1999 for "Collective Objects Management System Using R.F. Object Identification", the disclosure of which is hereby incorporated by reference, discloses a collective objects management system which eliminates the disadvantages noted above with file management systems. In addition, the collective objects management system disclosed in the '875 U.S. patent provides a simple and efficient way to find a desired object stored somewhere in a large collection of different objects. The system disclosed in the '875 U.S. patent uses R.F. sensitive circuits to maintain control of all objects in a collection. Each object has an associated R.F. sensitive circuit which resonates at a unique frequency when an R.F. signal at that unique frequency is received by the circuit, and an indicator coupled to the R.F. circuit for identifying the object to a human operator. The indicator is preferably a visible indicator—such as an LED-coupled to the object or the container for the object and which can readily be seen by a human operator. Alternatively, an audible indicator—such as a buzzer—can be used.

In a specific implementation of the invention in a file management system, a folder circuit is included in each file folder to be placed in a file drawer. Each folder circuit has a crystal responsive to a particular R.F. frequency, with the resonant frequency of a given crystal different from the resonant frequencies of all the other crystals. Each folder circuit is electrically coupled to a drawer signal input/output using the electrically conductive upper support rails usually found in conventional file cabinets. One of the rails is modified by electrically isolating that rail from the remaining electrically conductive elements in the drawer.

Each folder circuit includes an indicator, preferably an LED visible indicator, mounted along the upper margin of the folder in a location visible to a user when the drawer is opened. In addition, each drawer is provided with an indicator, preferably a flashing LED visible indicator, mounted on the front panel of the drawer. A current detector circuit is used to control the state of the drawer panel indicator.

All drawer input/output terminals are electrically coupled in parallel to an associated computer, either using dedicated connectors (i.e., hard wired) or transceivers (i.e., wireless communication). The computer includes an R.F. signal generator capable of generating signals matching all the crystal frequencies. To find a file, a user specifies that file to the computer, typically by using a keyboard or a mouse. The computer causes the R.F. signal generator to generate an R.F. signal whose frequency matches that of the specified file. The R.F. signal is transmitted to all the file cabinets in the system, and thus to all the file drawers. If the specified file is located in any one of the drawers, the indicator on the front panel of the drawer containing that file folder, and the indicator of the correct file folder, are both activated. The user then opens the drawer with the active panel indicator and removes the file folder with the active file folder indicator.

As applied to a file management system, the collective objects management system disclosed in the '875 U.S. patent eliminates the need for readable tabs or tags on each file folder, since the correct file folder is designated by the activated indicator. Also, the nature of a file folder can be changed by simply entering the necessary information into the computer. In addition, the integrity of the entire file system can be checked by using an R.F. sweep frequency generator to sweep the entire frequency range of crystal frequencies and detecting any frequency for which a resonant response is absent. The system can be readily and conveniently incorporated into existing file cabinets having the electrically conductive dual rail folder support mechanism. For other types of collective objects management systems, such as auto parts warehouses and integrated circuit manufacturing operations, the system can be implemented using standard object containers of known design.

As noted above, in the '875 system each object has an associated R.F. sensitive circuit having a single crystal which resonates at a unique frequency when an R.F. signal at that unique frequency is received by the circuit. This arrangement provides a unique one-to-one correspondence between an object and a given frequency. In a collective objects management system having a large number of objects, such as some file management systems with a large number of files, a correspondingly large number of crystals each having a resonant frequency different from all the other crystals is required. In order to guard against incorrect crystal activation it has been found useful to impose a minimum frequency separation between all crystals in the collection of crystals in the system. For example, in a system designed to operate over a frequency range of about 2 to about 20 mHz., a minimum crystal frequency separation of 1 kHz has been found to provide good results. The minimum frequency separation requirement, however, imposes an upper limit on the total number of crystals which can be used in the system, which places an upper limit on the total number of objects which can be accommodated by the system.

Commonly assigned, co-pending U.S. patent application Ser. No. 12/586,552 filed Sep. 24, 2009 for "Collective Objects Management System Using R.F. Object Identification With Multiple Crystals" discloses an improvement over the basic technique disclosed in the '875 U.S. patent. The improvement increases the potential number of objects which can be accommodated by a given system by providing more than one crystal for each R.F. sensitive circuit associated to a given object. By using two or more crystals in each file folder circuit, the total number of individual frequencies required to uniquely identify the collection of folders in a given system is significantly reduced. For example, in order to uniquely identify 20,000 different file folders, slightly less than 200 different paired frequencies are required for a system having two crystals in each R.F. sensitive circuit (as compared to 20,000 individual frequencies required in the single crystal system). Even though at least twice the number of crystals are needed in systems incorporating this improvement (as compared to systems using only a single crystal), the individual crystals can be selected from a stock of premanufactured crystals having standard resonant frequencies (as opposed to crystals which must be custom manufactured to provide a spectrum of resonant frequencies each separated from the others by a fixed frequency separation of 1 kHz), resulting in a substantial overall cost saving. In addition, this improvement provides a substantial expansion of the potential object (file folder) population in a given system due to the use of two or more crystals in each object (file folder) circuit. Thus, given a system constrained by the available frequency spectrum of choice (e.g., 2 mHz-20 mHz), this improvement affords the possibility of accommodating an object population which is several orders of magnitude greater than that afforded by the single crystal technique. Further, the improvement affords the advantages noted above without sacrificing any of the advantages inherent in the single crystal system.

Collective objects management systems using R.F. sensitive circuits and one or more R.F. signal generators are subject to radiation standards imposed by governmental authorities in most developed industrial countries. In such countries, before any R.F. system can be legally deployed it must be submitted for testing and approved by the regulatory authority having jurisdiction over such devices. In many cases, this testing requirement is relatively costly and time consuming, which acts as a deterrent to the implementation of such systems. In addition, any improvements and modifications to an approved R.F. signal generator requires that the system be again submitted, tested and approved in its modified form, which acts as a further deterrent to the implementation of R.F. based systems.

Commonly assigned, co-pending U.S. patent application Ser. No. 12/798,387 filed Apr. 3, 2010 for "Collective Objects Management System With Object Identification Using Addressable Decoder Units" discloses an improvement over the basic technique disclosed in the '875 U.S. patent and the multiple crystals technique disclosed in the above-referenced '552 U.S. patent application which offers the advantages noted above for R.F. based systems, but which avoids the need for R.F. radiation testing and is therefore less costly, easier, and quicker to implement than systems which rely on R.F. radiation transmission. The '387 technique uses addressable decoder units in place of R.F. crystals in the circuits associated with the objects to respond to object inquiry address signals.

More specifically, the '387 U.S. patent application discloses a system for managing objects distributed in an object location space, the system comprising a container, such as a file drawer, having a plurality of mutually electrically isolated electrically conductive paths, at least one of which can receive address signals supplied by a source and specifying a sought object; a plurality of object receptacles positioned in the container, each of the plurality of object receptacles having
- (a) a plurality of electrically conductive members, each of which is electrically coupled to a different one of the plurality of mutually electrically isolated electrically conductive paths;
- (b) an address decoder circuit associated to an object in the receptacle, the address decoder circuit having a unique system address, the address decoder circuit further having a plurality of electrically conductive terminals in electrical contact with the plurality of electrically conductive members; and
- (c) an indicator, such as a visible indicator (e.g., an LED) coupled to the address decoder circuit for activation whenever the address decoder circuit detects an address signal present on at least one of the plurality of electrically conductive members and representative of the unique system address.

The '387 system further includes a source comprising an encoder for generating the address signals, the encoder having at least one input terminal for receiving object identification signals from a supply device, at least one output terminal coupled to each address decoder circuit of the plurality of object receptacles, and circuitry for generating a signal representative of the unique system address of the object specified by the object identification signals.

In a specific embodiment, the container comprises a file folder drawer; and each object receptacle comprises a file folder having a pair of support braces, with one of the support braces containing the plurality of electrically conductive members. In this embodiment, the address decoder circuit and the indicator of each of the object receptacles are carried by one of the two support braces of each file folder.

Preferably, each file folder has an upper margin, and each indicator is mounted to the corresponding file folder in a position extending above the upper margin so as to be noticeable when the file folder drawer is in an opened position.

The file folder drawer includes at least two electrically non-conductive support members on which different ones of the plurality of mutually electrically isolated electrically conductive paths are located. One of the support braces of each of the plurality of object receptacles comprises an elongate body structure formed from an electrically non-conductive material with a pair of opposite ends, each end having a downwardly opening cut-out channel provided with a pair of spring contacts secured to the elongate body structure, with each spring contact being electrically coupled to a different one of the plurality of electrically conductive members. Each end of the one of the support braces of the plurality of object receptacles is supported by a different one of the at least two electrically non-conductive support members when received in the file folder drawer.

The two laterally spaced electrically non-conductive support members of the file folder drawer each has a width, with the width of each electrically non-conductive support member being different from the other. Similarly, the width of the cut-out channel at one of the opposite ends of the elongate body structure of each of the file folders is different from the width of the cut-out channel at the other one of the opposite ends of the elongate body structure of each of the file folders so that a given file folder can only be removably secured to the two support members in one proper orientation with each of the spring contacts in mechanical and electrical contact with the appropriate one of the electrically conductive paths.

The file folder drawer has a front panel with an additional indicator mounted thereon; and the system further includes circuitry for operating the additional indicator whenever an address decoder circuit located in the file folder drawer detects an address signal present on the at least one of the plurality of electrically conductive members and representative of the unique system address of that address decoder.

Each address decoder circuit includes circuitry for generating a VALID signal whenever that address decoder circuit detects an address signal present on the at least one of the plurality of electrically conductive members and representative of the unique system address of that address decoder circuit.

A microcomputer supplies power signals to the plurality of object receptacles via some of the electrically conductive paths, and address signals via the at least one of the electrically conductive paths; and receives VALID signals generated by each address decoder circuit when an incoming address matches a given address decoder circuit system address. The microcomputer also includes circuitry for generating information signals identifying the location in the system of any address decoder circuit which generates a VALID signal.

The '387 technique provides objects management capability for objects distributed in an object location space comparable to that afforded by R.F. based systems using specific frequency crystals but devoid of the disadvantages associated with the R.F. regulatory testing and approval process. In addition, the invention can be configured and constructed at less equipment cost than R.F. based systems, primarily due to the elimination of an R.F. signal generator at each object receptacle container site.

The '387 technique requires a minimum of four ohmic conductors for each object receptacle: one for the incoming address signals; one for the Valid output signal when an address decoder receives the matching address signal; one for the D.C. power required to power the object receptacle circuit; and one for the common ground path. Since the possibility of circuit failure is directly related to the number of ohmic conductors required for an operational circuit, it is desirable to reduce the number of required ohmic conductors.

SUMMARY OF THE INVENTION

The invention comprises a collective objects management system with object identification using addressable decoder units which reduces the number of ohmic conductors required for each object receptacle circuit to a minimum of two conductors per object receptacle circuit while providing the same operational capability as a four conductor system.

From a device aspect, the invention comprises a device for enabling the management of objects distributed in an object location space, the device comprising a receptacle for an object, such as a file folder for one or more associated documents, the receptacle having two electrically conductive members, one of which receives address signals supplied by a source, such as a remote system computer; an address decoder circuit associated to the object, the address decoder circuit having a unique system address, the address decoder circuit further having two electrically conductive terminals in electrical contact with the two electrically conductive members; an indicator, such as a visible indicator (e.g., an LED), coupled to the address decoder circuit for activation whenever the address decoder circuit detects an address signal present on the one of the two electrically conductive members and representative of the unique system address of that address decoder circuit, and circuitry coupled to the one of the electrically conductive members and the address decoder circuit for deriving operating power for the address decoder circuit from the address signal.

Associated with all such devices may be an encoder for generating the address signals, the encoder having at least one input terminal for receiving object identification signals from the supply device, an output terminal coupled to the address decoder circuit, and circuitry for generating a signal representative of the unique system address of the object specified by the object identification signals.

In a specific embodiment, the receptacle comprises a file folder having a pair of support braces, one of the support braces containing the two electrically conductive members; and the address decoder circuit and the indicator are carried by that one of the support braces containing the two electrically conductive members. In this embodiment, the support brace containing the two electrically conductive members comprises an elongate body structure formed from an electrically non-conductive material with a pair of opposite ends, each end having a downwardly opening cut-out channel provided with a pair of spring contacts secured to the elongate body structure, a portion of each spring contact pair being electrically coupled to a different one of the two electrically conductive members. To ensure proper mechanical installation, each spring contact has a free end which is received in a corresponding slot formed in the elongate body structure adjacent the ends thereof. To ensure proper orientation of a file folder during installation, the width of the cut-out channel at one of the opposite ends of the elongate body structure is different from the width of the cut-out channel at the other one of the opposite ends of the elongate body structure.

Preferably, each file folder has an upper margin; and the indicator is mounted to the file folder in a position extending above the upper margin for good visibility.

From a system standpoint, the invention comprises a system for managing objects distributed in an object location space, the system comprising:

a container, such as a file drawer, having two mutually electrically isolated electrically conductive paths, one of which can receive address signals supplied by a source and specifying a sought object;

a plurality of object receptacles positioned in the container, each of the plurality of object receptacles having
  (a) two electrically conductive members, each of which is electrically coupled to a different one of the two mutually electrically isolated electrically conductive paths;
  (b) an address decoder circuit associated to an object in the receptacle, the address decoder circuit having a unique system address, the address decoder circuit further having two electrically conductive terminals each in electrical contact with a different one of the two electrically conductive members;
  (c) an indicator, such as a visible indicator (e.g., an LED) coupled to the address decoder circuit for activation whenever the address decoder circuit detects an address signal present on the one of the two electrically conductive members and representative of the unique system address; and
  (d) circuitry coupled to the one of the electrically conductive members and the address decoder circuit for deriving operating power for the address decoder circuit from the address signal The system further includes a source comprising an encoder for generating the address signals, the encoder having at least one input terminal for receiving object identification signals from a supply device, an output terminal coupled to each address decoder circuit and power deriving circuit of the plurality of object receptacles, and circuitry for generating a signal representative of the unique system address of the object specified by the object identification signals.

In a specific embodiment, the container comprises a file folder drawer; and each object receptacle comprises a file folder having a pair of support braces, with one of the support braces containing the two electrically conductive members. In this embodiment, the address decoder circuit and the indicator of each of the object receptacles are carried by one of the two support braces of each file folder.

Preferably, each file folder has an upper margin, and each indicator is mounted to the corresponding file folder in a position extending above the upper margin so as to be noticeable when the file folder drawer is in an opened position.

The file folder drawer includes two electrically non-conductive support members on which different ones of the two mutually electrically isolated electrically conductive paths are located. One of the support braces of each of the plurality of object receptacles comprises an elongate body structure formed from an electrically non-conductive material with a pair of opposite ends, each end having a downwardly opening cut-out channel provided with a pair of spring contacts secured to the elongate body structure, with a portion of each spring contact pair being electrically coupled to a different one of the two electrically conductive members. Each end of the one of the support braces of the plurality of object receptacles is supported by a different one of the at least two electrically non-conductive support members when received in the file folder drawer.

The two laterally spaced electrically non-conductive support members of the file folder drawer each has a width, with the width of each electrically non-conductive support member being different from the other. Similarly, the width of the cut-out channel at one of the opposite ends of the elongate body structure of each of the file folders is different from the width of the cut-out channel at the other one of the opposite ends of the elongate body structure of each of the file folders so that a given file folder can only be removable secured to the two support members in one proper orientation with each of the spring contacts in mechanical and electrical contact with the appropriate one of the two electrically conductive paths.

The file folder drawer has a front panel with an additional indicator mounted thereon; and the system further includes circuitry for operating the additional indicator whenever an address decoder circuit located in the file folder drawer detects an address signal present on the one of the plurality of electrically conductive members and representative of the unique system address of that address decoder.

Each address decoder circuit includes circuitry for enabling the generation of a VALID signal whenever that address decoder circuit detects an address signal present on the one of the two electrically conductive members and representative of the unique system address of that address decoder circuit.

A microcomputer supplies address signals to all decoder circuits local to that microcomputer (e.g., all decoder circuits in a file cabinet having one or more drawers) via the one of the two electrically conductive paths; and receives VALID signals generated when an incoming address matches a given address decoder circuit system address. The microcomputer also includes circuitry for generating information signals identifying the location in the system of any address decoder circuit which generates a VALID signal.

The invention provides a significant improvement over the four conductor technique disclosed in the above-referenced '387 U.S. patent application. In particular, by reducing the number of ohmic conductors in the support rails and the braces to two, the probability of circuit non-operation due to a poor or intermittent ohmic connection is substantially reduced. Also, by reducing the number of ohmic conductors from four to two the materials cost is substantially reduced and the fabrication process is simplified. Lastly, the reduction in the number of ohmic conductors does not affect the functionality of the addressable decoder collective objects management system and the advantages this system affords over the R.F. based systems.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of collective object management systems. The following is a detailed description of one application of the invention in the field of file management systems.

Figure 1:
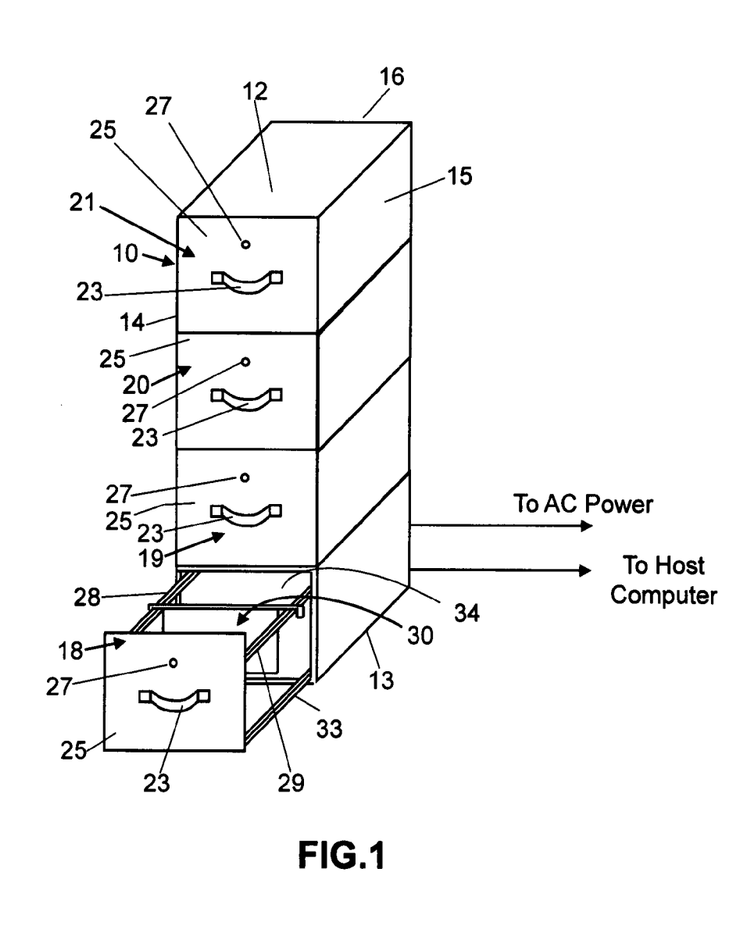
FIG. 1 is a perspective view of a multiple drawer file cabinet illustrating a hard wired embodiment of the invention.

Turning now to the drawings, FIG. 1 is a perspective view, taken from the right front, of a first embodiment of the invention in a file storage system application and using direct electrical connections between the file cabinets and the associated computer. As seen in this Fig., a multiple drawer file cabinet 10 (four drawers illustrated) of known mechanical construction has the usual top 12, bottom 13, sides 14, 15, and back 16. Four drawers 18-21 are slidably mounted in cabinet 10, each drawer 18-21 having a drawer pull 23 mounted on a front panel 25 thereof. A visible indicator device 27 is also mounted on the front panel 25 of each drawer 18-21. Indicator 27 may comprise any one of a number of known elements capable of providing a visible signal when activated in the manner described below. Examples of suitable indicators are a conventional LED indicator, and a type 276-036 flashing LED indicator available from Radio Shack Corporation.

Lower-most drawer 18 is shown in the opened position in order to provide a perspective view of the basic drawer structure and the manner in which a file folder is removably supported in a file drawer. As shown, drawer 18 is provided with a pair of upper support members 28, 29 described in detail below, which serve the primary purpose of supporting individual file folders, such as file folder 30, in the drawer. Secondarily, support members 28, 29 may also provide structural rigidity for the drawer 18 itself. Drawer 18 also has a pair of lower members 32, 33 (only one of which (member 33) is visible in FIG. 1) which complete the horizontal structural elements. In a commonly used file cabinet structure, members 28, 29, 32, and 33 may form an inner frame insert (along with vertically arranged frame members) which can be physically installed in a standard drawer. To complete the drawer structure, a back 34 is connected to the members 28, 29, 32, 33. All file folders, such as folder 30, are removably supported by upper support members 28, 29 using horizontal support braces (described below) to which the folder 30 is mechanically secured. The mechanical structure of folder 30 is conventional. The structure and arrangement of drawers 19-21 are identical to that of drawer 18. As indicated by the legended lead lines shown to the lower right of file cabinet 10, an A.C. power connection provides A.C. electrical power to the electronic components described below and located within file cabinet 10. Similarly, a hard-wired connection is coupled between file cabinet 10 and an associated host computer for the purposes described below.

Figure 2:
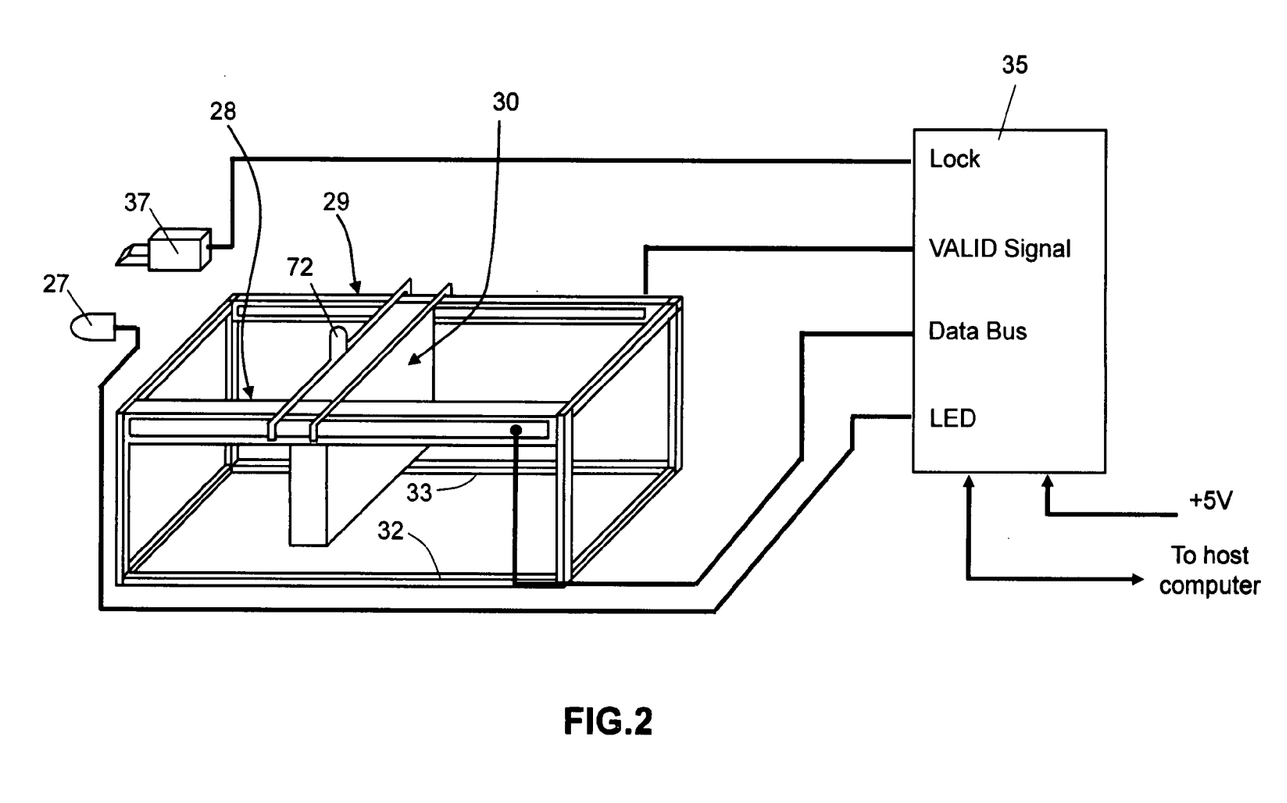
FIG. 2 is a schematic side perspective view of a single file drawer and file folder and associated elements according to the invention.
Figure 4:
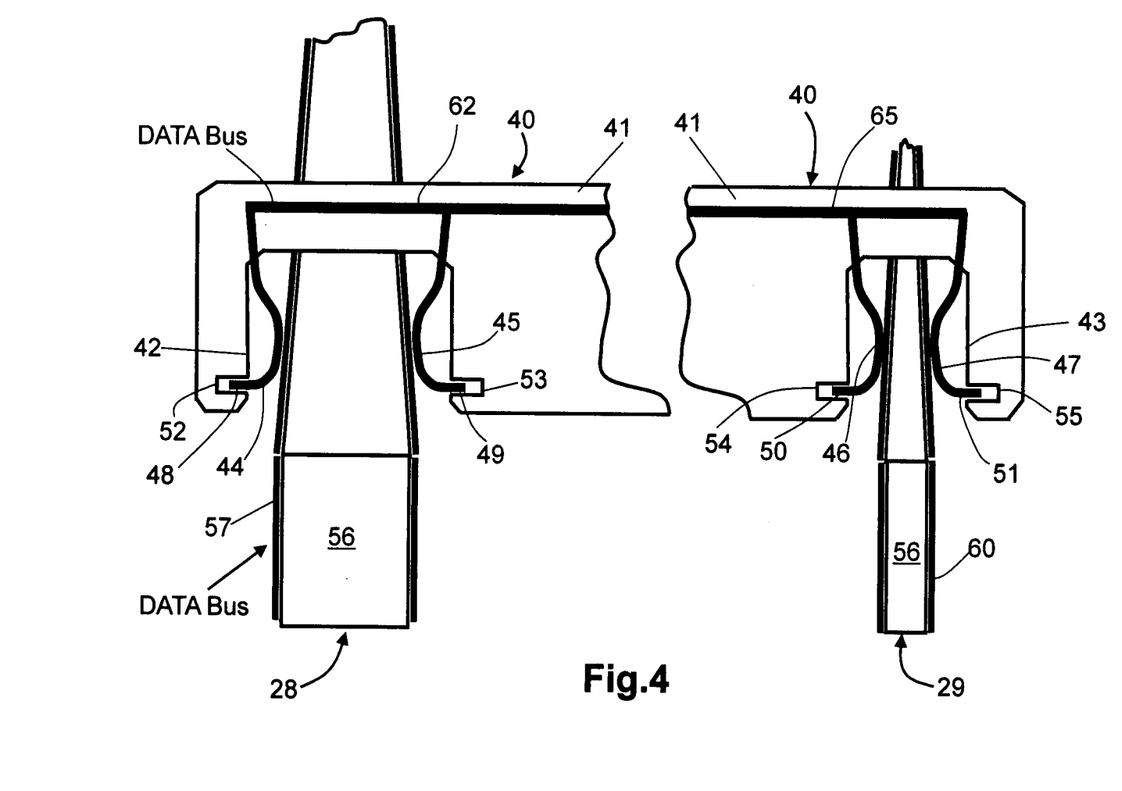
FIG. 4 is a fragmentary view of a single folder brace and a pair of upper support members for the folder brace showing the manner in which the folder brace is removably attached to the upper support members according to the invention.
Figure 7:
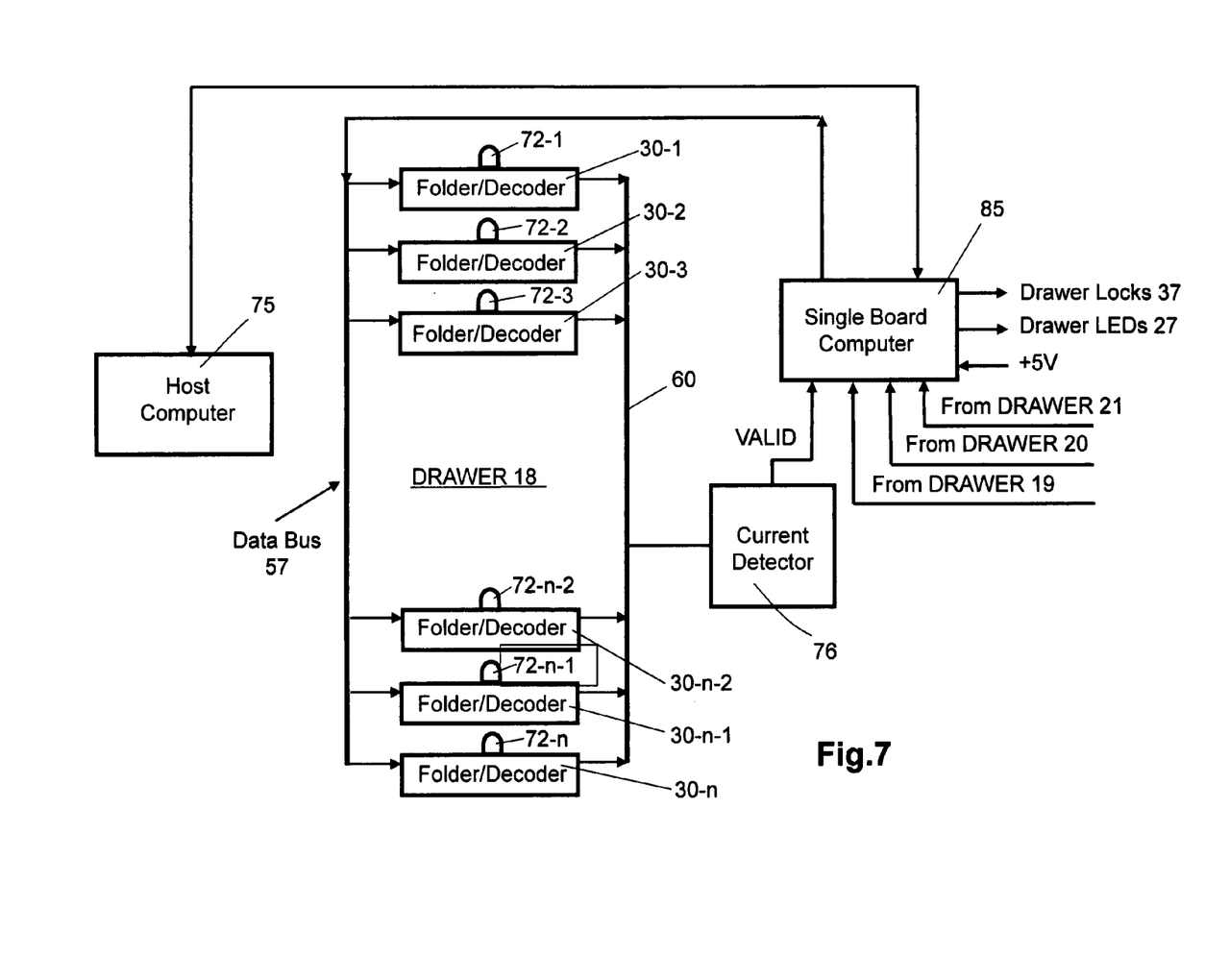
FIG. 7 is a schematic top plan view of a single drawer and the major system components of the invention.

As best shown in FIG. 2, each folder, such as folder 30 depicted in this Fig., is mechanically supported in a removable manner by upper support members 28, 29. Upper support members 28, 29 of each drawer 18-21 are electrically isolated from the remaining drawer frame structure by means of insulating elements described below. Also, upper support members 28, 29 are each provided with one electrically conductive strip 57, 60, respectively which are illustrated in FIGS. 4 and 7. Each strip 57, 60 is connected by individual conductors to a different one of two terminals of a local microcomputer 35 located in the filing cabinet 10. These two terminals are labeled "Data Bus" and "VALID Signal" in FIG. 2. Microcomputer 35, which is preferably a type AT89C2051 device available from Intel Corporation of Santa Clara, Calif., is coupled to a host computer (not illustrated in FIG. 2) and also to a suitable source of D.C. power (+5V) derived from the A.C. power input noted above. Microcomputer 35 has a pair of output terminals labelled "LED" and "Lock" for controlling the state of indicator 27 and an electrically operated drawer lock mechanism 37. The "Data Bus" terminal supplies address information to the file folder circuitry via electrically conductive strip 57. The "VALID Signal" terminal receives a VALID signal from a current detector described below whenever the file folder circuitry of a given folder decodes an address received from microcomputer 35 which matches the address of that file folder circuitry.

Figure 3:
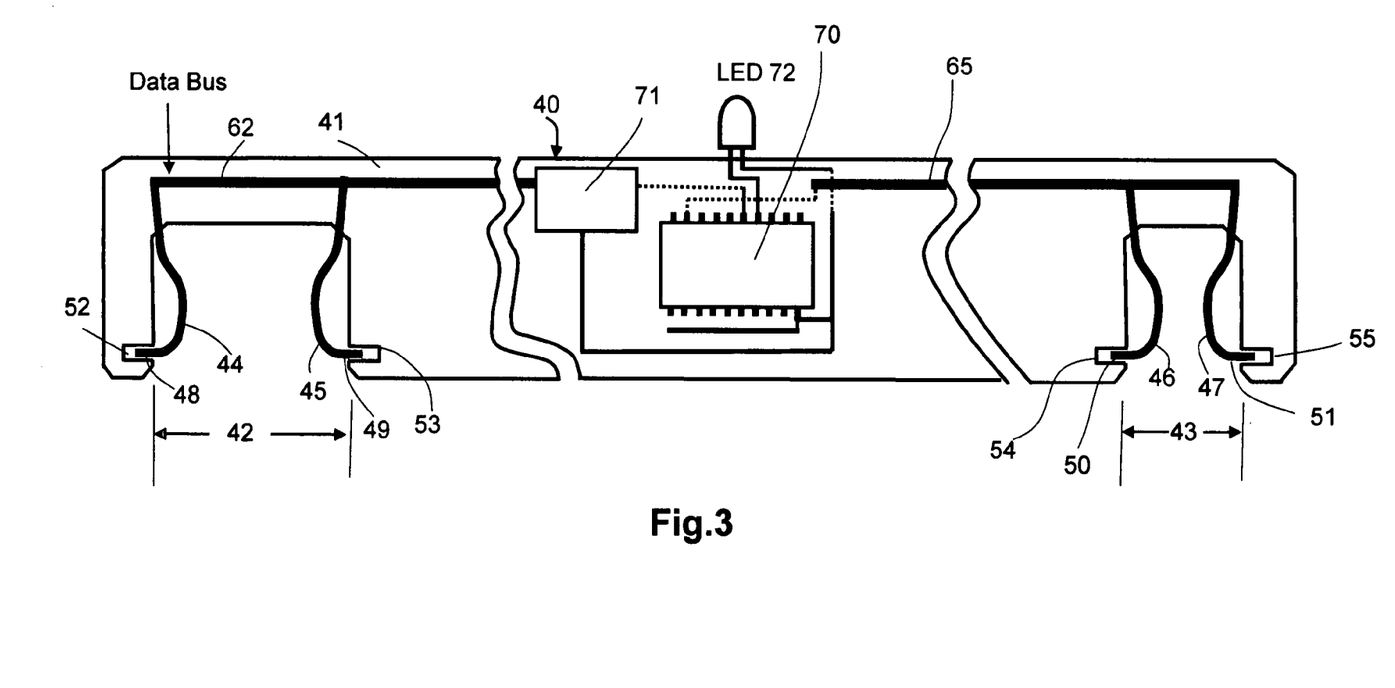
FIG. 3 is a front elevational view partially broken away of a folder brace bearing the electrical components located at the file folder according to the invention.

FIGS. 3 and 4 illustrate the structure of the primary one of the two horizontal support braces incorporated into each file folder 30. The other horizontal brace for each folder is of conventional electrically-nonconductive construction. As seen in these Figs., the primary support brace 40 has an elongate body structure 41 formed from a suitable electrically non-conductive material, such as conventional circuit board material, phenolic, or the like. At each end, the elongate body structure has a cut-out channel 42, 43 having a width slightly larger than the width of the corresponding upper support member 28, 29. Each cut-out channel 42, 43 is provided with a pair of spring contacts 44-47 which are secured to the elongate body structure in any suitable manner, such as by heat stamping, gluing, or mechanically embedding. Each spring contact has a free end 48-51 which is received in a corresponding slot 52-55 formed in elongate body structure 41. The separation distance between the proximate portions of spring contacts 44-45, and 46-47 is slightly less than the width of the corresponding upper support member 28, 29 so that effective mechanical and electrical contact will be made when a primary brace is installed on upper support members 28, 29.

To facilitate correct installation of a primary brace, the widths of cut-out channels 42, 43 and the separation distances between spring contacts 44, 45 and 46, 47 are substantially different so that a primary brace can only be installed in one orientation.

This is necessary in order to ensure that the proper electrical connections are made whenever a primary brace in installed in a file drawer.

Correspondingly, the widths of upper support members 28, 29 are different as best depicted in FIG. 4. As seen in this Fig., each upper support member 28, 29 has a central core 56 fabricated of electrically non-conductive material, such as the same material used for the fabrication of elongate body structure 41; and a single electrically conductive strip 57, 60 secured to the outer side surface and extending along the length of upper support members 28, 29. Each electrically conductive strip 57, 60 is dedicated to a different electrical signal, with strip 57 electrically connected to the Data Bus terminal of microcomputer 35, and strip 60 electrically coupled to the VALID Signal terminal of microcomputer 35.

With reference to FIG. 3, spring contacts 44, 45 are both electrically connected to an electrically conductive path 62; while spring contacts 36, 37 are electrically connected to an electrically conductive path 65. Electrically conductive paths 62, 65 are electrically connected to different terminals of a decoder integrated circuit chip 70. Decoder chip 70 is a commercially available device which receives multi-bit address information along Data Bus conductor 62 from microcomputer 35, compares this address information with a unique address stored in decoder chip 70, and activates a folder LED 72 when the received address matches the address stored in decoder chip 70. Folder LED 72 is mounted on the upper margin of elongate body structure 41 of folder 30 in a position so as to be visible when the drawer is open. The internally generated activation signal for folder LED 72 is latched by the decoder so that, once an address match is detected, the folder LED 72 activation signal remains active until the decoder 70 latch is reset by removing the folder from the upper support members 28, 29, or changing the input address from encoder 80. Decoder chip 70 is preferably a type PT2272 decoder available from Princeton Technology Corp. of Taipei, Taiwan.

Figure 5:
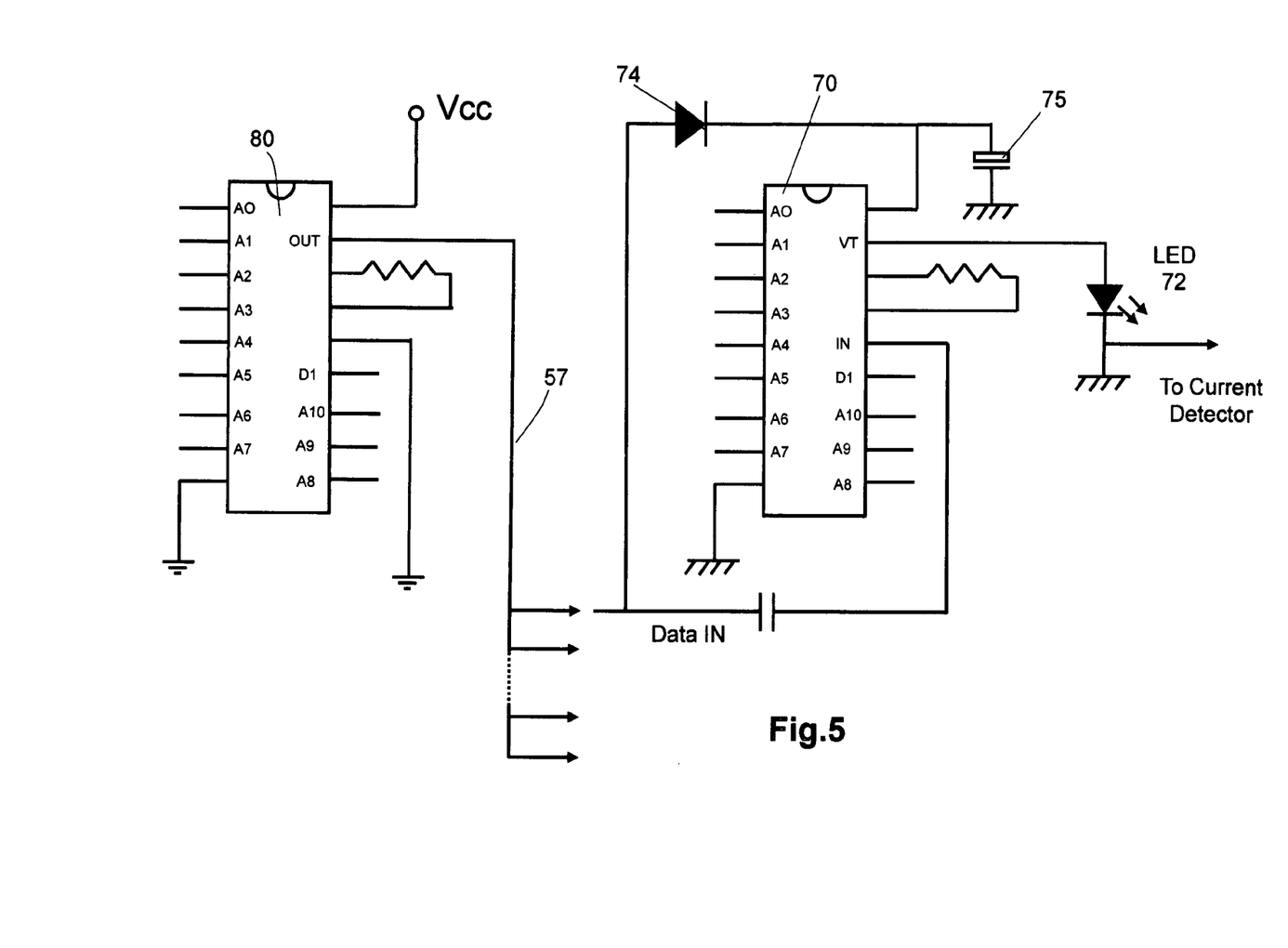
FIG. 5 is a schematic diagram of an encoder and decoder used to encode and decode the object addresses according to the invention.

FIG. 5 is a schematic diagram illustrating a single decoder 70 and a matching encoder 80. Encoder 80 is preferably a type PT2262 encoder available from Princeton Technology Corp. of Taipei, Taiwan. Encoder 80 has a plurality of address input terminals A0-A10 to which address input signals are supplied via MCU 35 by a host computer (not illustrated in FIG. 5). An output terminal labeled "OUT" serially outputs the address information supplied to address input terminals A0-A10. These address output information signals are transmitted via conductive strip 57 to the address input IN of decoder 70. Decoder 70 has a plurality of address input terminals A0-A10 which are hard-wired to a unique address. In the preferred implementation, decoder 70 is a tri-state device such that the hard wire connections to address inputs A0-A1-can be either ground, Vcc or floating. The address signals generated by encoder 80 are AC coupled to the address IN terminal of decoder 70. When received, the address signals from encoder 80 are compared internally of decoder 70 with the hard-wired decoder address signals. If a match occurs, the voltage output of terminal VT of decoder 70 increases, which activates folder LED 72 and causes increased current to flow through LED 72.

Significantly, D.C. power required to operate decoder 70 and LED 72 is derived from the data input signals supplied from encoder 80 by means of a diode 74 and a storage capacitor 75. The ordinary ground terminals of decoder 70 and capacitor 75, as well as the cathode terminal of LED 72, are connected together to form an internal ground for the circuit contained in brace 40. This eliminates the need for two additional conductors to supply D.C. power and a return ground connection from microcomputer 35. In FIG. 3 discrete elements diode 74 and storage capacitor 75 reside in block 71.

Figure 6:
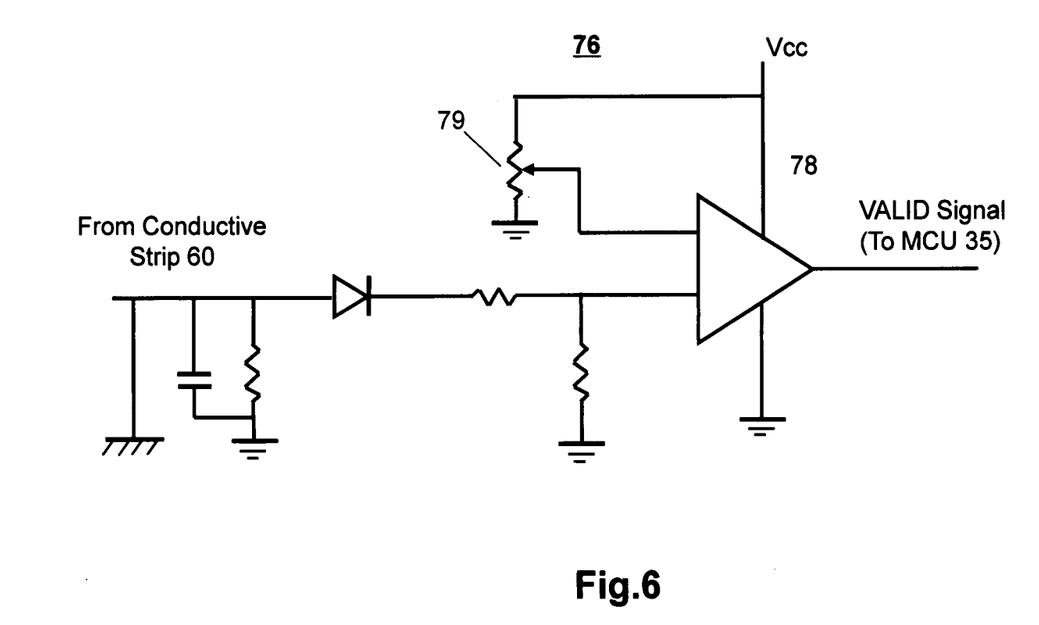
FIG. 6 is a circuit diagram of a current detector circuit in the preferred embodiment.

The current flowing through LED 72 is monitored by a current detector 76 shown in FIG. 6. With reference to this Fig., the current flowing through LED 72 is converted to a voltage by the R-C network depicted in the lower portion of the circuit diagram and this voltage is applied to the inverting input of an operational amplifier 78. A reference voltage is supplied to the non-inverting input of amplifier 78. The value of the reference voltage can be adjusted by varying the value of an adjustable resistance 79. When the current through LED 72 increases, the output of amplifier 78 changes state to signify that an address match has occurred. This VALID signal is then coupled to microcomputer 35. The VALID signal remains asserted so long as the received address matches the stored address and is used by microcomputer 35 to activate the drawer lock mechanism 37 and the drawer indicator 27. There is one current detector 76 for each drawer in a file cabinet.

FIG. 7 is a schematic top plan view of a single drawer 18 and the major system components of the invention showing the manner in which a plurality of folder circuits can be physically arranged in a single file drawer. As seen in this Fig., each folder 30-1, 30-2, . . . 30-n is supported in the drawer in such a manner that the appropriate electrical connections described above are made with the Data bus and VALID signal conductors 57, 60 of the upper support members 28, 29. The Data bus and VALID signal conductors are connected to a single board computer 85 shown in FIG. 8.

Figure 8:
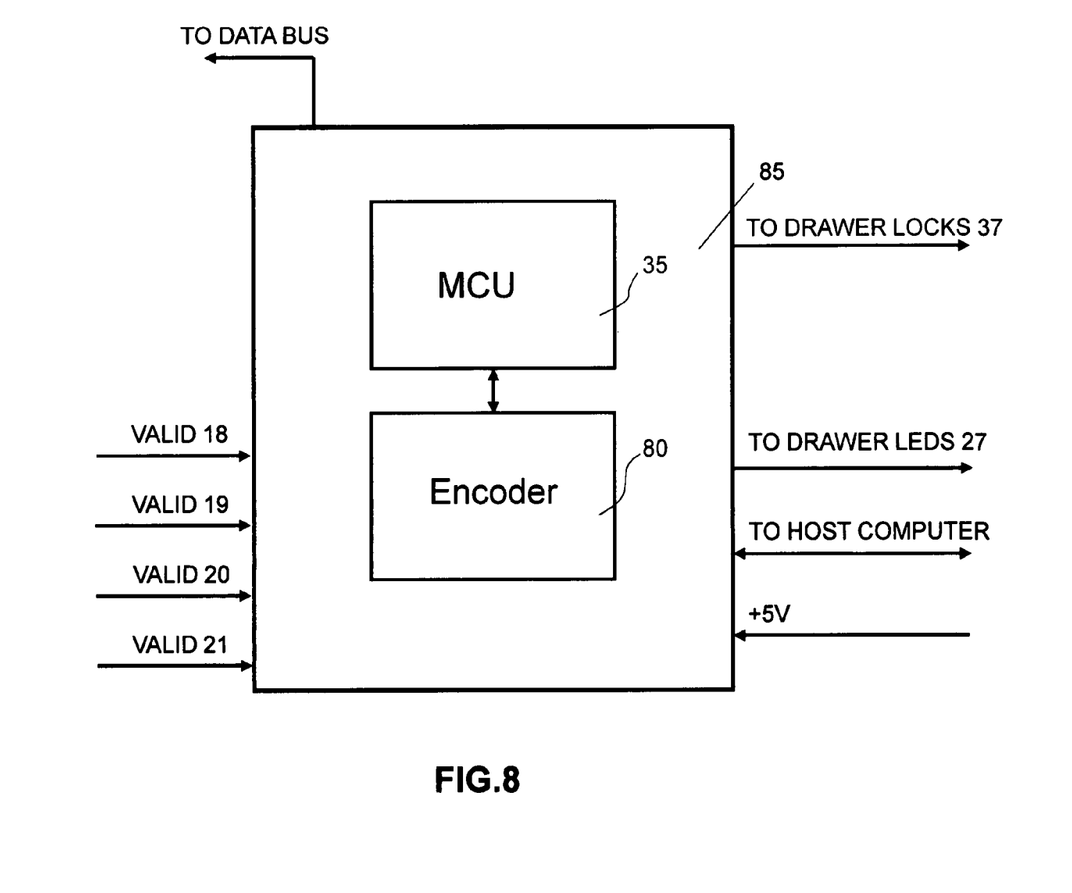
FIG. 8 is a schematic block diagram of the single board computer for a single file cabinet.

FIG. 8 is a schematic block diagram of the single board computer 85 for a single file cabinet 10 operationally connected to the system. As seen in this Fig., single board computer 85 comprises a microcomputer 35 and an encoder 80, both described above, with inputs and outputs as shown. Each file cabinet 10 is supplied with one single board computer 85. Optionally, each single board computer 85 may be provided with a unique identifying address in the system, for identification and maintenance purposes.

Each single board computer 85 comprising the elements shown in FIG. 8 supplies object address signals received from a host computer 75 and encoded by an address encoder 80 located in single board computer 85 to all of the decoder circuits 70 incorporated into the primary support braces 40 of each folder 30-1, 30-2, . . . 30-n in the associated file cabinet 10i. Whenever an object address signal matches the address encoded into a decoder circuit 70 located in a given folder 30-1, 30-2, . . . 30-n in a given drawer in a given file cabinet 10i, a VALID signal is generated by the current detector 76 connected to the conductive strip 60 servicing the drawer in which the targeted folder is located. This VALID signal is coupled to the single board computer 85 in the associated file cabinet 10i. In response to the receipt of a VALID signal, the corresponding single board computer 85 generates an operating signal for the drawer lock 37 of the appropriate drawer and activates the drawer LED 27 of the appropriate drawer in the file cabinet. In addition, the single board computer 85 generates a signal which is transmitted back to the host computer 75 indicating that the object folder has been found and identifying the drawer and file cabinet in which the file folder with the correct address is located. As signified by the legended inputs "From DRAWER 19", "From DRAWER 20", and "From DRAWER 21", single board computer 85 responds to a VALID signal from each of these other drawers by generating a signal which is transmitted back to the host computer 75 indicating that the object folder has been found and identifying the drawer and file cabinet in which the file folder with the correct address is located. Upon receipt of this information, host computer 75 updates the information stored therein by comparing the drawer and file cabinet information received from single board computer 85 with the same information stored in memory, changing the information as necessary, and terminating the object address signals originally transmitted to single board computer 85.

To find a file folder in the system, the operator enters the basic file information into host system computer 75, which contains a complete list of file folder addresses, as well as the drawer number and file cabinet ID in which each addressable folder is purportedly located. The host computer 75 transmits a file folder request to the single board computer 85 in all of the file cabinets 10i, and the single board computers 85 in all of the file cabinets 10i in the system place the specified folder address on the Data Busses of their respective file cabinets 10i. If the sought file folder is actually located in a given drawer, the single board computer 85 in the associated file cabinet 10i receives a VALID signal in response to the operation of the decoder circuit 70 whose address matches the address requested by host computer 75, generates the control signals described above for the appropriate drawer lock 37 and drawer front LED 27, and transmits back to host computer 75 the file cabinet and drawer information noted above. When the operator opens the drawer having the illuminated drawer front LED 27, the correct file folder will be indicated by the illuminated file folder LED 72i. If the file cabinet information or drawer location information (or both) do not match the same information stored in the memory of host computer 75, this information is updated by host computer 75. In the event that there is no file folder 30i operationally installed in the collection of file cabinets 10i whose address matches that of the requested address, host computer 75 will note the absence of a response to the file folder address inquiry and mark its records accordingly.

The integrity of the entire collection of file folders 30i can be quickly checked by operating host computer 75 in the sweep address mode. As the addresses are swept over the entire range of possible addresses, all folder circuits which are operationally present in the collection of file cabinets 10i will respond with a VALID signal and this will be detected by the corresponding single board computer 85 and transmitted back to host computer 75. The address of any missing or non-functioning file folder 30i will not result in the generation of a VALID signal, and this lack of response will be detected by host computer 75. This absence of an operational file folder 30i of a given specific address can be correlated by host computer 75 to the file folder identification in host computer 75 by noting the addresses of the non-responsive file folder circuits.

The system may be initially configured by creating a list in host computer 75 of all permissible file folder addresses, installing a collection of file folders 30i each having a different but permissible address in random drawers in file cabinets 10i, sequentially generating the set of permissible addresses, and correlating the drawer ID and file cabinet ID information for each address for which host computer 75 receives this information from a single board computer 85. As new folders are added to the system, the file folder address, file cabinet and drawer information can be directly entered into host computer 75: since each address is unique, there can be no duplications.

Figure 9:
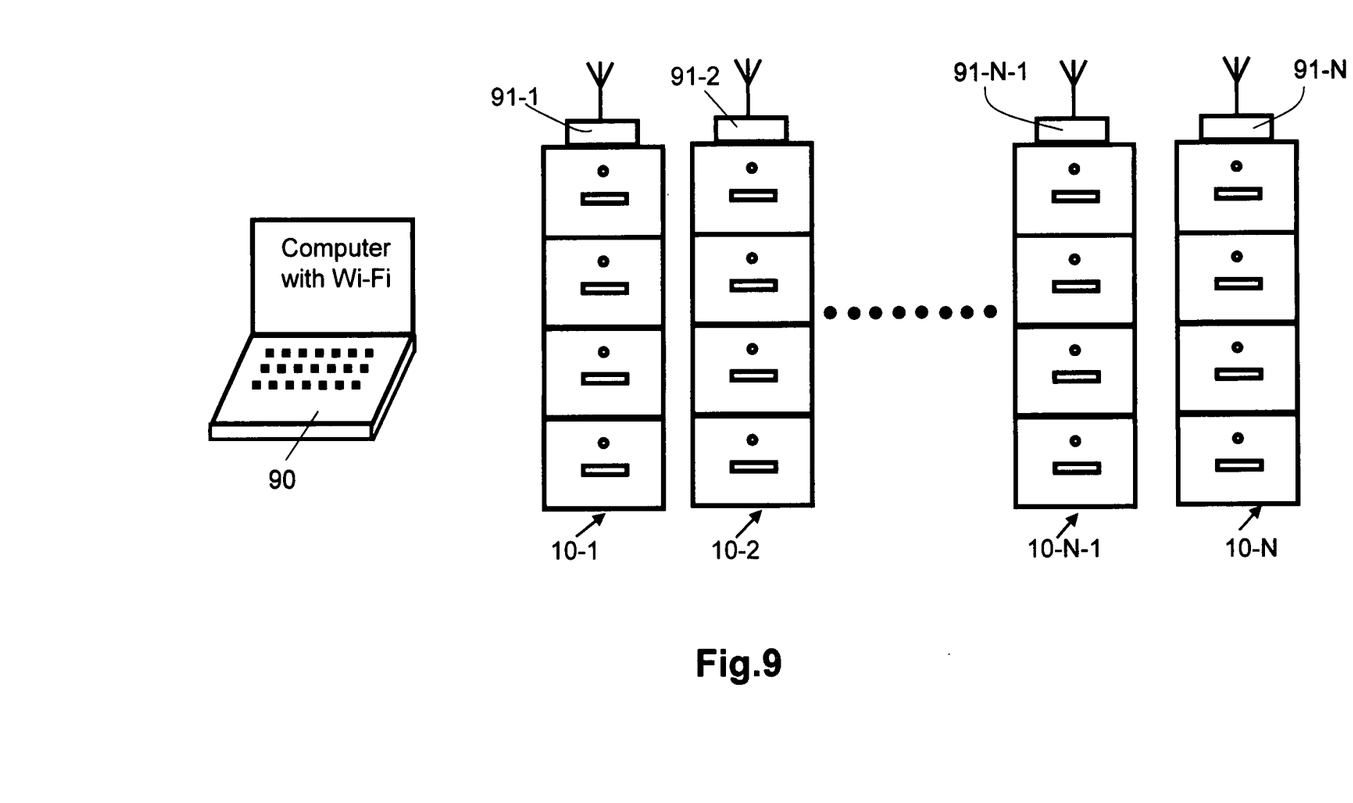
FIG. 9 is a schematic perspective view of a multiple file cabinet arrangement in a wireless embodiment of the invention.

FIG. 9 illustrates an alternate embodiment of the file management system implementation of the invention using wireless communication between the individual file cabinets 10i and host computer 75. As seen in this Fig., each cabinet 10i is provided with a WIFI transceiver 91i for communication with a host computer 90 similarly equipped. WIFI transceivers 911 are preferably commercially available units which have already undergone and passed radiation testing, such as a Wibox wireless device server unit available from Lantronix Inc. of Irvine, Calif. The host computer 90 is provided with a matching internal WIFI transceiver. Operation of the FIG. 9 system is essentially identical to that of the system of FIGS. 1-7, with the exception that the folder identification signals are transmitted to file cabinets 10i using wireless transmission and the file cabinet and drawer information signals are transmitted to host computer 75 using wireless transmission, rather that the hard wired connections of the embodiment of FIGS. 1-8. In addition, there may be additional security considerations to the wireless embodiment of FIG. 9 in order to prevent unauthorized transmission and reception, and interception, of the WIFI signals.

The invention provides a significant improvement over the four conductor technique disclosed in the above-referenced '387 U.S. patent application. In particular, by reducing the number of ohmic conductors in support rails 28, 28 and braces 40 to two, the probability of circuit non-operation due to a poor or intermittent ohmic connection is substantially reduced. Also, by reducing the number of ohmic conductors from four to two the materials cost is substantially reduced and the fabrication process is simplified. Lastly, the reduction of the number of ohmic conductors does not affect the functionality of the addressable decoder collective objects management system and the advantages this system affords over the R.F. based systems.

Although the above description is devoted to an implementation of the invention in the field of file management systems, the invention has much wider application. In general, the invention can be used in any collective object management system in which the need exists for a technique for rapidly identifying a given class or type of object from a collection of objects. For example, in an automotive parts warehouse operation, the objects may be individual vehicle parts (such as carburetors, alternators, gaskets or the like) stored in bins on shelves. In a manufacturing operation, the objects may be the individual items manufactured in the plant (such as different types of integrated circuits manufactured by an integrated circuits manufacturer) contained in individual packages. In any application, the address decoder circuit and indicator associated to a specific object are closely coupled to the object itself and electrically coupled to a local address encoder so that the circuits can respond to the reception of a desired object address and activate the indicator in such a way that a human operator can locate the object specified by the address.

Although the above provides a full and complete disclosure of the preferred embodiments of the invention, various modifications, alternate constructions and equivalents will occur to those skilled in the art. For example, while the invention has been described with reference to specific address encoder and decoder circuitry, other circuitry may be employed, depending on the preferences of the system designer. Moreover, while the indicators 27, 64 have been described as visible indicators, other types of indicators, such as audible indicators, may be used, if desired. In addition, while the specific circuitry has been described with reference to a single file cabinet, it is understood that the invention may be implemented using multiple file cabinets positioned at the same or different locations in an office. Further, the invention may be used to manage a file system of many cabinets positioned at different physical locations using an internal or an external computer network, if desired. Also, while the invention has been disclosed with an implementation in which each support rail has one ohmic conductor, if desired the two ohmic conductors can be mounted on opposite side surfaces of only one of the two support rails. This would require modification of the conductive paths on the braces 40 to accommodate the different geometry. Therefore, the above should not be construed as limiting the invention, which is defined by the appended claims.

What is claimed is:

1. A device for enabling the management of objects distributed in an object location space, said device comprising:
    a receptacle for an object, said receptacle having two electrically conductive members, a first one of said electrically conductive members being provided to receive address signals supplied by a source;
    an address decoder circuit associated to said object, said address decoder circuit having a unique system address, said address decoder circuit further having a first electrically conductive terminal coupled to said first one of said two electrically conductive members for receiving said address signals, and a second electrically conductive terminal;
    an indicator having an input terminal and an output terminal, said input terminal of said indicator being coupled to said second electrically conductive terminal of said address decoder circuit for activation whenever said address decoder circuit detects an address signal present on said first one of said two electrically conductive members and representative of said unique system address, said output terminal of said indicator being coupled to a second one of said two electrically conductive members of said receptacle;
    a current detector circuit having an input terminal and an output terminal, said input terminal of said current detector circuit being coupled to said second one of said two electrically conductive members of said receptacle, said current detector providing a VALID signal on the output terminal thereof when said indicator is activated; and
    circuitry coupled to said first one of said electrically conductive members and said address decoder circuit for deriving operating power for said address decoder circuit from said address signal.

2. The device of claim 1 wherein said indicator is a visible indicator.

3. The device of claim 2 wherein said visible indicator is an LED.

4. The device of claim 1 wherein said source includes an encoder for generating said address signals, said encoder having an input terminal for receiving object identification signals from a supply device, an output terminal coupled to said address decoder circuit, and circuitry for generating a signal representative of the unique system address of the object specified by said object identification signals.

5. The device of claim 1 wherein said receptacle comprises a file folder having a pair of support braces, one of said support braces containing said two electrically conductive members; and wherein said address decoder circuit and said indicator are carded by said one of said support braces.

6. The device of claim 5 wherein said one of said support braces comprises an elongate body structure formed from an electrically non-conductive material with a pair of opposite ends, each end having a downwardly opening cut-out channel provided with a pair of spring contacts secured to the elongate body structure, each spring contact being electrically coupled to a different one of said two electrically conductive members.

7. The device of claim 6 wherein the width of said cut-out channel at one of said opposite ends of said elongate body structure is different from the width of said cut-out channel at the other one of said opposite ends of said elongate body structure.

8. The device of claim 6 wherein each said spring contact has a free end which is received in a corresponding slot formed in said elongate body structure adjacent the ends thereof.

9. The device of claim 5 wherein said file folder has an upper margin; and wherein said indicator is mounted to said file folder in a position extending above said upper margin.

10. A system for managing objects distributed in an object location space, said system comprising:
    a container having two mutually electrically isolated electrically conductive paths;
    a plurality of object receptacles positioned in said container, each of said plurality of object receptacles having
        (a) two electrically conductive members, each of said two electrically conductive members of each of said plurality of object receptacles being electrically coupled to a different one of said two mutually electrically isolated electrically conductive paths, one of said electrically conductive paths being provided to receive address signals supplied by a source and to furnish said address signals to a first one of said two electrically conductive members;
        (b) an address decoder circuit associated to said object, said address decoder circuit having a unique system address, said address decoder circuit further having a first electrically conductive terminal coupled to said first one of said two electrically conductive members for receiving said address signals, and a second electrically conductive terminal;
        (c) an indicator having an input terminal and an output terminal, said input terminal of said indicator being coupled to said second electrically conductive terminal of said address decoder circuit for activation whenever said address decoder circuit detects an address signal present on said first one of said two electrically conductive members and representative of said unique system address, said output terminal of said indicator being coupled to a second one of said two electrically conductive members of said receptacle;
        (d) a current detector circuit having an input terminal and an output terminal, said input terminal of said current detector circuit being coupled to said second one of said two electrically conductive members of said receptacle, said current detector providing a VALID signal on the output terminal thereof when said indicator is activated; and
        (e) circuitry coupled to said first one of said two electrically conductive members and said address decoder circuit for deriving operating power for said address decoder circuit from said address signal.

11. The system of claim 10 wherein said indicator is a visible indicator.

12. The system of claim 11 wherein said visible indicator is an LED.

13. The system of claim 10 wherein said source includes an encoder for generating said address signals, said encoder having an input terminal for receiving object identification signals from a supply device via said first one of said two mutually electrically isolated electrically conductive paths, an output terminal coupled to each said address decoder circuit of said plurality of object receptacles, and circuitry for generating a signal representative of the unique system address of the object specified by said object identification signals.

14. The system of claim 10 wherein said container comprises a file folder drawer; and wherein said plurality of object receptacles each comprises a file folder having a pair of support braces, one of said support braces containing said two electrically conductive members; and wherein said address decoder circuit and said indicator of each of said plurality of object receptacles are carried by said one of said support braces.

15. The system of claim 14 wherein said file folder drawer includes two electrically non-conductive support members on which different ones of said two mutually electrically isolated electrically conductive paths are located; and wherein one of said support braces of each of said plurality of object receptacles comprises an elongate body structure formed from an electrically non-conductive material with a pair of opposite ends, each end having a downwardly opening cut-out channel provided with a pair of spring contacts secured to the elongate body structure, a portion of each spring contact pair being electrically coupled to a different one of said two electrically conductive members, each end of said one of said support braces of said plurality of object receptacles being supported by a different one of said two electrically non-conductive support members when received in said file folder drawer.

16. The system of claim 14 wherein said file folder drawer has two laterally spaced electrically non-conductive support members each having a width, the width of each electrically non-conductive support member being different from the other; and wherein the width of said cut-out channel at one of said opposite ends of said elongate body structure of each of said file folders is different from the width of said cut-out channel at the other one of said opposite ends of said elongate body structure of each of said file folders so that a given file folder can only be removably secured to said two support members in one orientation with each of said spring contacts in mechanical and electrical contact with the appropriate one of said electrically conductive paths.

17. The system of claim 14 wherein said file folder drawer has a front panel having an additional indicator mounted thereon; and wherein said system further includes circuitry for operating said additional indicator whenever an address decoder circuit located in said file folder drawer detects an address signal present on said one of said two electrically conductive members and representative of the unique system address of that address decoder.

18. The system of claim 10 wherein each said address decoder circuit is coupled to said current detector circuit so that a VALID signal is generated whenever that address decoder circuit detects an address signal present on said first one of said two electrically conductive members and representative of said unique system address; and further including a microcomputer for supplying said address signals via said one of said electrically conductive paths, and for receiving said VALID signal.

19. The system of claim 18 wherein said microcomputer includes circuitry for generating information signals identifying the location in the system of any address decoder circuit which generates a VALID signal.

20. A system for managing objects distributed in an object location space, said system comprising:
    a container comprising a file folder drawer having two mutually electrically isolated electrically conductive paths;
    a plurality of object receptacles positioned in said container, each of said plurality of object receptacles comprising:
        (a) a file folder having a pair of support braces, one of said support braces containing two electrically conductive members, each of said two electrically conductive members of each of said plurality of object receptacles being electrically coupled to a different one of said two mutually electrically isolated electrically conductive paths, one of said electrically conductive paths being provided to receive address signals supplied by a source;
        (b) an address decoder circuit associated to said object, said address decoder circuit having a unique system address, said address decoder circuit further having two electrically conductive terminals in electrical contact with a different one of said two electrically conductive members;
        (c) an indicator coupled to said address decoder circuit for activation whenever said address decoder circuit detects an address signal present on said one of said two electrically conductive members and representative of said unique system address, said address decoder circuit and said indicator of each of said plurality of object receptacles being carried by said one of said support braces; and
        (d) circuitry coupled to said one of said electrically conductive members and said address decoder circuit for deriving operating power for said address decoder circuit from said address signal,
    said file folder drawer including two electrically non-conductive support members on which different ones of said two mutually electrically isolated electrically conductive paths are located; and one of said support braces of each of said plurality of object receptacles comprising an elongate body structure formed from an electrically non-conductive material with a pair of opposite ends, each end having a downwardly opening cut-out channel provided with a pair of spring contacts secured to the elongate body structure, a portion of each spring contact pair being electrically coupled to a different one of said two electrically conductive members, each end of said one of said support braces of said plurality of object receptacles being supported by a different one of said two electrically non-conductive support members when received in said file folder drawer,
    said file folder drawer including two laterally spaced electrically non-conductive support members on which different ones of said two mutually electrically isolated electrically conductive paths are located; and wherein one of said support braces of each of said plurality of object receptacles comprises an elongate body structure formed from an electrically non-conductive material with a pair of opposite ends, each end having a downwardly opening cut-out channel provided with a pair of spring contacts secured to the elongate body structure, a portion of each spring contact pair being electrically coupled to a different one of said two electrically conductive members, each end of said one of said support braces of said plurality of object receptacles being supported by a different one of said two electrically non-conductive support members when received in said file folder drawer, said two electrically non-conductive support members each having a width, the width of each electrically non-conductive support member being different from the other; and the width of said cut-out channel at one of said opposite ends of said elongate body structure of each of said file folders being different from the width of said cut-out channel at the other one of said opposite ends of said elongate body structure of each of said file folders so that a given file folder can only be removably secured to said two support members in one orientation with each of said spring contacts in mechanical and electrical contact with the appropriate one of said electrically conductive paths.

* * * * *